United States Patent Office 3,702,689
Patented Nov. 14, 1972

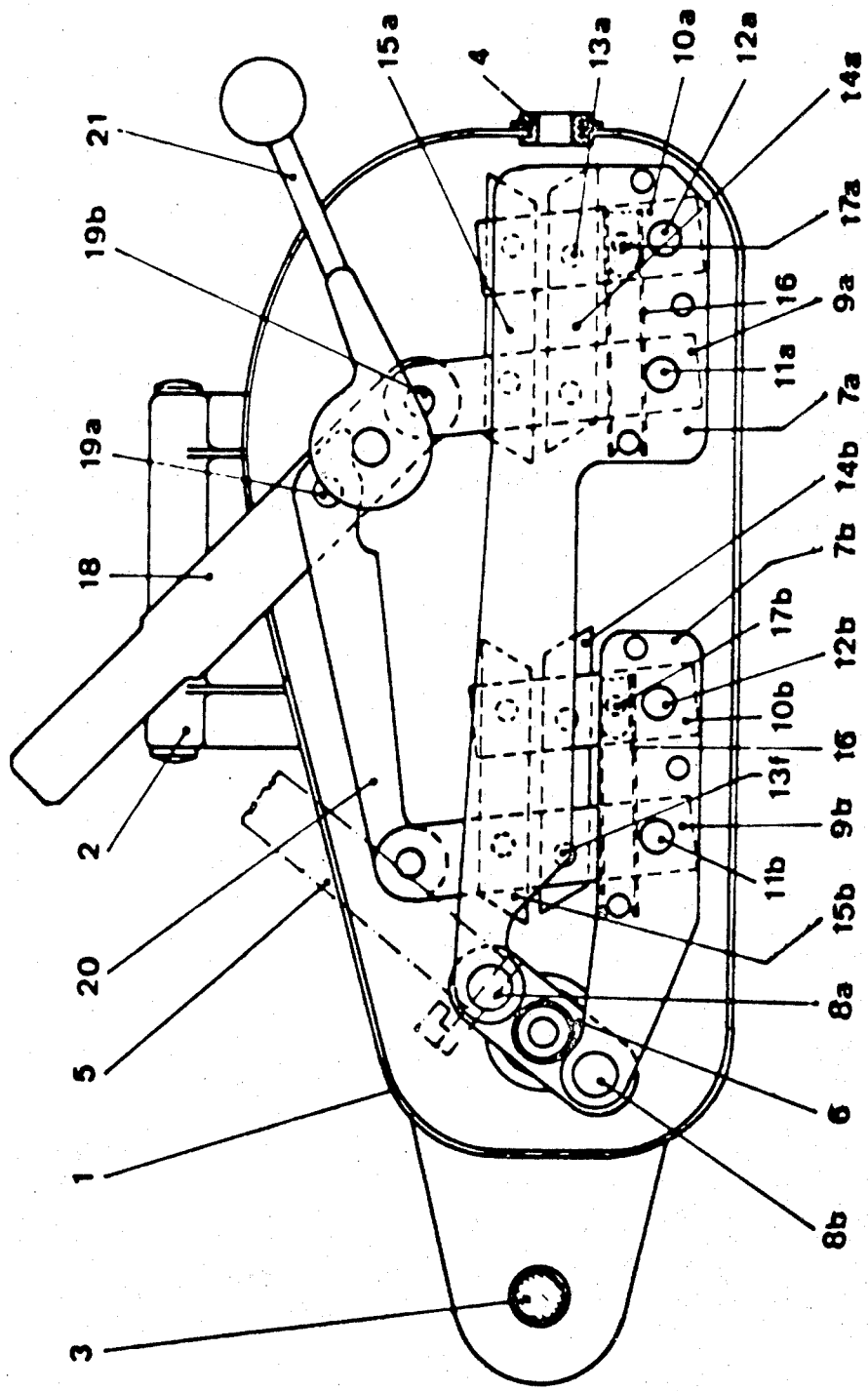

3,702,689
APPARATUS FOR GRIPPING AND PULLING AN ELONGATED FLEXIBLE ELEMENT
Alfred Zeller, Gotthardstr. 12, Thalwil, Switzerland
Filed Jan. 6, 1971, Ser. No. 104,246
Int. Cl. B66f 1/00
U.S. Cl. 254—107
9 Claims

ABSTRACT OF THE DISCLOSURE

Two pairs of jaws are provided in line in a single housing, each pair being adapted to work in alternation with the other and each in turn gripping and moving the elongated flexible element and then releasing it and moving along the same to renew its grip, for effecting a displacement of a load or weight attached for instance to one end of the element or, for similar purposes. The jaws are connected with linkages to constitute with the same movable parallelograms which grip the element under the influence of traction on the same in such a manner that with increasing load the gripping force increases, but to a proportionately smalled extent.

BACKGROUND OF THE INVENTION

The present invention relates to gripping apparatus in general, and more particularly to apparatus for gripping and pulling elongated flexible elements, such as ropes, cables, or the like.

In apparatus of the general type which is known in the art, the jaws of the gripping units are linked together by a system of levers with apertures and corresponding pins being provided for connecting them, and being of double-semi-circular but longitudinally-offset cross section. Links established in this connection have a tendency to wear quite rapidly, and if a heavy load or traction acts upon the flexible element to be gripped and moved, friction becomes excessive and the motion is blocked, and there is further tendency for the flexible element to become disengaged at some point along the movement which is imparted to it by the devices.

SUMMARY OF THE INVENTION

It is, accordingly, an object of the present invention to avoid these disadvantages of the prior art.

More particularly, it is an object of the present invention to provide an improved apparatus of the type here under discussion which is not possessed of such disadvantages.

In pursuance of the above objects and others which will become apparent hereafter, the invention provides an apparatus of the type under discussion which overcomes the disadvantages of the art by utilizing pairs of jaws which form with cooperating pairs of levers respective parallelogram motions. When the flexible elongated element, hereafter for the sake of convenience called a "rope," is preliminarily contacted by the jaws of a particular pair, the traction force exerted upon the rope by a load acting upon it is transmitted to the jaws in such a manner that, with increasing longitudinal reaction force, the gripping force exerted by the jaws increases less than proportionally. In this manner excessive friction and pressure leading to a possible damaging of the rope by the jaws, are avoided, as is the danger that the rope might become disengaged and become disconnected from the jaws. The returning pair of jaws, on the other hand will open themselves by the action of the relatively pushing rope and so be saved from sliding along the rope.

It was thought, heretofore, that in an apparatus of this type under discussion a longitudinal relative motion of the jaws during their engagement with the rope must be avoided because it might damage the rope. However, in direct contradistinction to this previously-held opinion it was quite surprisingly found, in accordance with the present invention, that the limited relative longitudinal motion of the jaws which is a characteristic of the apparatus according to the present invention produces an especially soft gripping action which in actual fact increases the lifetime of the rope, rather than being deleterious thereto.

Also, in contrast to the existing apparatus of the type under discussion, where the sets of gripping jaws are intended to move forwardly and backwardly in a strictly straight line, the present invention permits the sets of jaws to perform minor transverse translations and pivoting motions, thus making superfluous the provision of intermediate levers between the pairs of jaws and the operating handle. Evidently, this results in a simplified construction which only needs a single intermediate level for the reverse motion, that is when the rope is intended to move backwards.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure is a somewhat diagrammatic longitudinal section through an exemplary embodiment of the invention.

DESCRIPTION OF THE PREFERRED EMBODIMENTS

Discussing now the drawing in detail, it will be seen that the apparatus in the illustrated exemplary embodiment comprises a casing or housing 1 having a carrying handle 2, an anchoring hole at one side so that the casing may be secured to a support, and a guide opening at the opposite side, that is the side which in operation will face the direction in which a load acts upon a rope to be gripped and advanced.

An operating handle 5 is provided and pivoted on a shaft 6 which is secured in the casing 1; the handle is to be manually operated. In operation of the device, displacement of the handle 5 by turning it in the direction away from the load, causes a longer side plate 7a—which is linked with the handle 5 by bearing 8a situated above the pivot axis 6— to be displaced in the working direction, that is the direction in which the rope is to be moved. A second side plate 7b is connected with the handle 5 via a bearing 8b located below the pivot axis 6, at the same time moves back in the opposite direction, that is oppositely the advancement of the rope.

A pair of long levers 9a and 9b are provided, as well as a pair of short levers 10a and 10b; they are connected with the side plates 7a and 7b via bearings 11a, 11b, 12a and 12b. Each lever is connected with a pair of jaws 14a, 15a or 14b, 15b, respectively, via two bearings or pivots situated on a common line which includes an angle with the longitudinal extension of the respective lever. These pivots are identified with the reference numerals 13a–13d, respectively, as well as 13e–13h, and because of their location on the respective levers, form the corners of a parallelogram one pair of sides of which forms a fixed angle with the longitudinal extension of the levers 9, whereas the other pair of sides is parallel to the jaws 14 and 15. The aforementioned angle provides for a rapid decreasing of the distance between the jaws of the respective pairs, when one of the side plates 7a or 7b advances, so as to obtain a rapid gripping effect between the jaws. A pair of springs 17a, 17b are provided, and are each located on one of the side plates 7a, 7b to produce a preliminary pressure so that the rope from the beginning may react upon the jaws.

When, as above described, the operating handle 5 is turned away from the load (i.e. towards the left) the plate 7b moves in the direction towards the load, that is oppositely the direction of advancement of the rope, whereas the side plate 7a moves counter to the movement of the plate 7b and thus counter to its own previous movement. This causes the jaws 14a, and 15a to advance and grip the rope while the jaws 14b and 15b release from the rope and return to starting position. The gripping and releasing is primarily produced by the interaction of the jaws and the rope and are only initiated by the translational displacement of the sets of jaws.

When the operating handle is turned to the right (towards the load) the working of the two pairs of jaws will be reversed so that the jaws 14b, 15b will now do the work of jaws 14a, 15a, and vice versa.

When it is desired to have the rope moved backwardly, that is to lower a load for instance which is secured on the rope, the reversing handle 18 must be operated. This handle is linked via pivots 19a and 19b with the levers 9 and the intermediate lever 20. When handle 18 is operated, and when the levers are in gripping inclination, the two jaws 14a, 15a and 14b, 15b, respectively, will move the rope in reverse direction instead of advancing it.

An additional lever 21 is provided which serves for opening both the pairs of jaws when a rope without a load or a traction acting upon it is to be handled; this facilitates ready introduction of the rope between the jaws.

Actually, the levers 9 and 10 could be repositioned in reverse relationship, and the lever 20 could be connected with the other levers. These and other modifications which will offer themselves readily to those skilled in the art are intended to be encompassed within the context of the present invention. It is possible, for instance, by making such modifications to achieve a construction in which both the handle 5 and the handle 18 have the same inclinational orientation and as a consequence may be located in essentially a common plane.

Resort to the present invention provides an apparatus in which the gripping of the rope is effected by the parallel motion of the respective jaws of a pair. The preliminary gripping of the rope by the jaws takes place under the influence of the springs provided for the purpose, or due to the force exerted upon the jaws by the operating handle; further gripping engagement is the result of a pivotal displacement due to a rotative momentum acting upon the jaws as a result of the traction force acting upon the rope itself. The inclination of the levers with reference to two parallelogram sides assures the desired decrease of the relationship of normal pressure to longitudinally acting traction. On the other hand, reversal of operation of the device depends upon having the laterally located axis of the lever system on the other side of the axis of the rope.

It will be understood that each of the elements described above, or two or more together, may also find a useful application in other types of constructions differing from the types described above.

While the invention has been illustrated and described as embodied in an apparatus for gripping and pulling elongated flexible elements, it is not intended to be limited to the details shown, since various modifications and structural changes may be made without departing in any way from the spirit of the present invention.

Wihout further analysis, the foregoing wil lso fully reveal the gist of the present invention that others can by applying current knowledge readily adapt it for various applications without omitting features that, from the standpoint of art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Apparatus for gripping and pulling elongated flexible elements, such as metal ropes, comprising at least two pairs of jaws arranged in line and each including a set of pivoted levers defining with the jaws of the respective pair a parallelogram motion; linking means linking said pairs of jaws for alternate operation in a sense combining advancing of a first pair of jaws with its gripping, and returning of a second pair of jaws with its releasing, the gripping and releasing being respectively produced by the approaching and withdrawing, respectively, of the jaws within said parallelogram motion; and actuating means for actuating said linking system.

2. An apparatus as defined in claim 1, actuated by a handle which is connected with the said gripping parallelograms by a system of levers pivoting on axes laterally offset from the longitudinal axis of the said elongated flexible element, so that the actuating handle as well as the force acting upon the flexible element from an attached load or from the returning pair of jaws when the flexible element is in contact with the jaws, produce a rotative momentum upon the lever system resulting in the gripping or releasing effect.

3. An apparatus as defined in claim 2, the pairs of levers forming with pairs of jaws a movable parallelogram, being linked with said jaws by round bearings forming the edges of the parallelogram and placed on a line forming with the axes of the parallel levers an angle assuring the rapid approaching, respectively withdrawing, of the jaws together with a decreasing gripping quotient.

4. An apparatus as defined in claim 2, comprising a housing; an actuating handle pivoted for turning movement about an axis within and fixed relative to said housing, two bearings on both sides of that axis, connecting it directly and without intermediate lever with the gripping blocks consisting of a pair of parallel levers, a pair of parallel jaws and a side-plate, so that these blocks, when moved by the actuating handle, during their way forwards and backwards, may execute small transversal translatory and pivoting motions.

5. An apparatus as defined in claim 4, with a reverse handle for moving the elongated flexible element backwards, pivoting on a free axis supported by the levers connecting it with the gripping jaws in an analogous manner as the actuating handle but differing by an intermediate lever between it and one of said gripping blocks, and by pivoting axes of the parallel levers located on the opposite side of the longitudinal axis of the elongated flexible element.

6. An apparatus as defined in claim 4, with a release handle opening both pairs of jaws simultaneously.

7. An apparatus as defined in claim 4, including spring means associated with the respective side plates and exerting biasing pressure upon at least one linking lever associated with a respective pair of jaws.

8. An apparatus as defined in claim 1, said jaws being sharp in the pulling direction, and blunt in the opposite direction.

9. An apparatus as defined in claim 4, the bearing means between said side-plates and linking levers being self-lubricating.

References Cited

UNITED STATES PATENTS

| | | | |
|---|---|---|---|
| 3,222,742 | 12/1965 | Persiaux | 24—134 N |
| 3,485,478 | 12/1969 | Desplats | 254—106 |

FOREIGN PATENTS

| | | | |
|---|---|---|---|
| 139,930 | 4/1953 | Sweden | 24—134 N |

ROBERT C. RIORDON, Primary Examiner

D. R. MELTON, Assistant Examiner

U.S. Cl. X.R.

24—134 N